United States Patent [19]

Snyder

[11] Patent Number: 5,305,374
[45] Date of Patent: Apr. 19, 1994

[54] ENHANCED TERMINAL TELECOMMUNICATIONS SYSTEM

[76] Inventor: Gary K. Snyder, 1011 E. Calle Monte Vista Dr., Tempe, Ariz. 85284

[21] Appl. No.: 868,889

[22] Filed: Apr. 16, 1992

[51] Int. Cl.⁵ ............................................. H04M 1/21
[52] U.S. Cl. ...................................... 379/67; 379/76; 379/155
[58] Field of Search .................. 379/67, 88, 89, 76, 379/143, 155

[56] References Cited

U.S. PATENT DOCUMENTS 5,014,301  5/1991  Maltezos .............................. 379/88
5,029,197  7/1991  Hashimoto .......................... 379/67

*Primary Examiner*—James L. Dwyer
*Assistant Examiner*—Fan Tsang
*Attorney, Agent, or Firm*—Tod R. Nissle

[57] ABSTRACT

Telephone communication apparatus permits an individual, while using a telephone, to select the language which both will be utilized in all messages given to the individual by the telephone and will be utilized by an operator, reservation clerk, or other individual that the individual contacts for assistance while using the telephone apparatus.

3 Claims, 3 Drawing Sheets

ENHANCED TERMINAL TELECOMMUNICATIONS SYSTEM

BACKGROUND OF THE INVENTION

1. Field of the Invention

This invention relates to telecommunication apparatus.

More particularly, the invention relates to telephone communication apparatus which permits an individual, while using a telephone, to select the language which both will be utilized in all messages given to the individual by the telephone and will be utilized by an operator, reservation clerk, or other individual that the individual contacts for assistance while using the telephone apparatus.

In a further respect, the invention relates to telephone communication apparatus which, without requiring that the telephone contact a host computer, will designate on site the language in which all messages will be provided a user, will contact an operator conversant in the designated language, and will display messages to the user in the language selected by the user.

2. Description of the Related Art

Businessmen from foreign countries who are traveling in the United States often are not conversant in the English language and have occasion to make telephone calls which require the businessmen to converse with an operator, reservation clerk, etc. Such telephone calls often are awkward, or impossible, for the businessmen because of inability of such businessmen to speak the English language.

Accordingly, it would be highly desirable to provide an improved telephone system which would enable a businessman or other traveler to instantly select a foreign language in which the telephone system would display messages to the businessman and which would be spoken by an operator, reservation clerk or other individual contacted by the businessman while using the telephone system.

Therefore, it is a principal object of the invention to provide an improved telephone system.

Another object of the invention is to provide an improved telephone system which is readily utilized by a person not fluent in the English language.

A further object of the invention is to provide an improved telephone system which can select the language preferred by a user and connect the user to an individual fluent in the selected language without requiring that the telephone system first communicate with a host computer to obtain the telephone number or other information necessary to place a call to contact the individual who is fluent in the language.

BRIEF DESCRIPTION OF THE DRAWINGS

These and other, further and more specific objects and advantages of the invention will be apparent to those skilled in the art from the following detailed description thereof, taken in conjunction with the drawings, in which.

SUMMARY OF THE INVENTION

Briefly, in accordance with my invention, I provide improved telecommunication apparatus for use in combination with an existing telephone line. The apparatus includes means for connecting the apparatus to an existing telephone line; means for receiving the voice of a first individual utilizing the apparatus and for transmitting the voice over the telephone line; memory means for storing a selected number of telephone use instructions, each of the instructions being stored in a plurality of languages, and a plurality of telephone numbers each for dialing over the telephone line an operator who speaks one of the plurality of languages; dialing means for entering telephone numbers in the telephone apparatus, telephone numbers entered on the dialing means normally being transmitted by the apparatus through the telephone line; display means for selectively displaying the telephone use instructions by using at least one of the pair comprising visual display means, and audio display means; language selection means for selecting which of the plurality of languages is used to display the telephone use instructions on the display means; and, operator dialing means. The operator dialing means, after the language selection means is utilized to select a language, recalls from the memory means the telephone number for the operator who speaks the selected language, and dials the telephone number recalled from the memory means to contact over the telephone line the operator who speaks the selected language. The language selection means can display over the display means a series of messages designating how to select a language for use in displaying the telephone use instructions, the series of messages each being presented in a different language.

DESCRIPTION OF THE PREFERRED EMBODIMENT(S)

Figure 1:
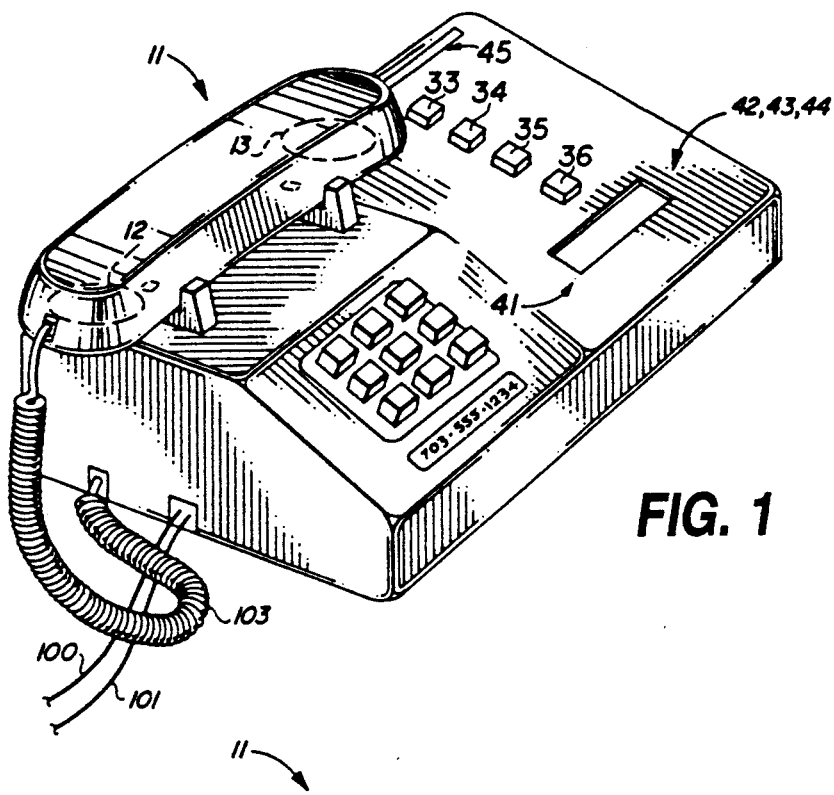
FIG. 1 is a perspective view of telephone apparatus constructed in accordance with the principles of the invention.
Figure 2:
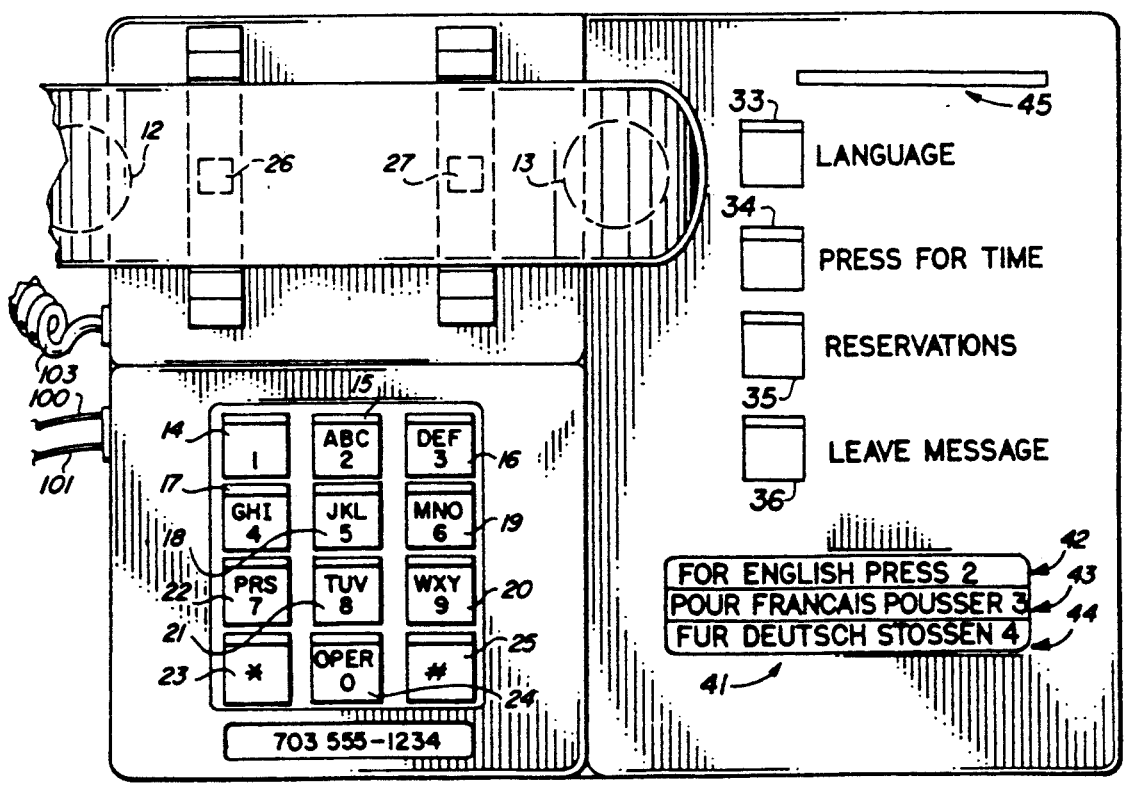
FIG. 2 is a top view illustrating the telephone apparatus of FIG. 1 and showing further construction details thereof.

Turning now to the drawings, which depict the presently preferred embodiments of the invention for the purpose of illustrating the practice thereof and not by way of limitation of the scope of the invention, and in which identical reference characters represent corresponding elements throughout the several views, FIGS. 1 and 2 illustrate telephone apparatus constructed in accordance with the invention and including push buttons 14-25 and handset 11 having a speaker 13 mounted in one end and a receiver 12 mounted in the other end. A businessman, traveler, or other individual, termed the "user" herein, utilizing the apparatus of FIGS. 1 and 2 holds handset 11 adjacent his head so he can speak into receiver 12 and listen via speaker 13 to the voice of a customer, friend, operator, or other person, termed the "caller" herein, with whom the user is conversing. When handset 11 is removed from the cradle of the apparatus of FIGS. 1 and 2, buttons 26, 27 rise and a dial tone can be head emanating from speaker 13. Push buttons 14-22, 24 are depressed in conventional manner to dial a telephone number after handset 11 has been lifted from the cradle of the telephone apparatus. Whether a telephone number dialed on buttons 14-22, 24 is transmitted through the telephone line 100 or is transmitted through the telephone line 100 from the memory unit of the apparatus, depends, as will be explained, on the status and use of the apparatus circuitry. The free end (not shown) of cable 101 is adapted to be plugged into a conventional one hundred and fifteen volt wall outlet. Cable 101 provides power for the apparatus circuitry. Slot 45 receives and reads a credit card in the event a user wishes to make a credit card call.

Push buttons 33 to 36 each remain in a pushed down position when depressed and return to their normal up position when the finger pressure against the button is released.

The display screen 41 includes LED readout lines 42–44. If desired, the apparatus of FIGS. 1 and 2 can include a speaker and voice generation means attached to the speaker so messages can be audibly displayed to a user. In FIG. 2, line 42 displays the message or instruction "FOR ENGLISH PRESS 2", which indicates to an English speaking user that the user should depress button 15 to select the English language as the language in which messages to user will appear on the display screen 41. Line 43 displays the message or instruction "FOR FRANCAIS POUSSER 3" which indicates to a French speaking user that the user should depress button 16 to select the French language as the language in which messages to the user will appear on the display screen 41. Line 44 displays the message or instruction "FUR DEUTSCHE STOSSEN 4" which indicates to a German speaking user that the user should depress button 17 to select the German language as the language in which messages to the user will appear on the display screen 41. The messages shown on screen 41 in FIG. 2 appear after the user depresses the "LANGUAGE" button 33. Before button 33 is depressed, and when a user first begins to use the apparatus of FIGS. 1 and 2, the message "PRESS LANGUAGE BUTTON" can appear on display screen 41 in several languages. For sake of the discussion herein, it is assumed that the telephone apparatus of FIGS. 1 and 2 is programmed to provide messages in and contact operators who speak in the three languages of English, German, and French. The telephone apparatus can be programmed to provide messages in and contact individuals who speak in as many different languages as desired.

Figure 3:
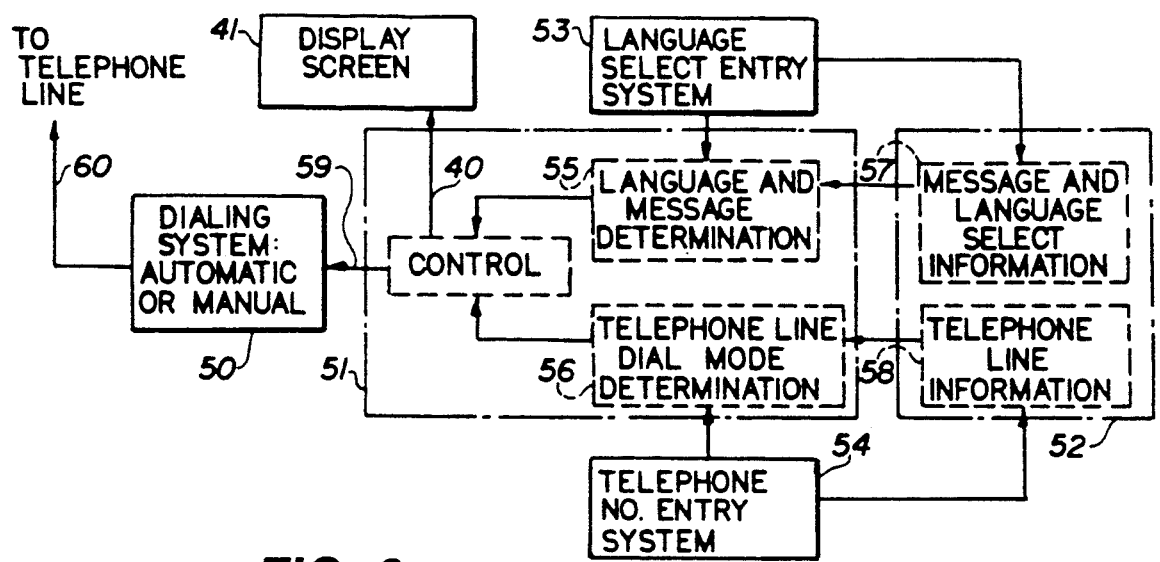
FIG. 3 is a block diagram illustrating a telecommunication system embodying the present invention; and, FIG. 4 is a block diagram which illustrates a typical program or logic function utilized in accordance with the presently preferred embodiment of the invention.

FIG. 3 is a block diagram which illustrates a preferred embodiment of the telephone apparatus of the present invention, the main components of which are a dialing system 50 for transmitting a call to telephone line 100, a display 41, a dialing and display controller 51, and a memory 52. A language select entry system 53 (which includes button 33) and a telephone number entry system 54 (which includes buttons 14 to 25) are provided. As indicated by the dashed lines, the controller 51 performs the dual functions of language and message determination 55 and telephone line dial mode determination 56. Memory 52 contains message and language select information 57 and telephone line information 58, respectively. The language select information 57 includes information like that shown below in TABLE I: MESSAGES DISPLAYED TO PERMIT USER TO SELECT LANGUAGE. The language select information is information which enables the telephone apparatus to assist a user in selecting the particular language in which the user would like messages displayed to the user and in which the user would like to converse with an operator, reservation agent, or other individual. The message select information includes information like that shown below in TABLE II: AUXILIARY MESSAGES. The auxiliary messages are messages displayed to the user in order to facilitate the user's operation of the telephone apparatus to make a telephone call, make a reservation, obtain the time, or undertake any other function for which the telephone apparatus is designed. The telephone lien information 58 includes information like that shown below in TABLE III: NUMBERS FOR DIALING OPERATORS SPEAKING SELECTED LANGUAGES. The telephone line information 58 also includes numbers which are direct dialed by the user by pressing buttons 14–22, 24. The memory 52, controller 51, entry system 53, entry system 54, screen 41, and dialing system 50 are all located on site in the telephone apparatus of FIGS. 1 and 2 such that the apparatus is self contained and operates in the fashion described herein without having to obtain the information provided by memory 52, system 53, or system 54 from a remote central host computer.

TABLE I

MESSAGES DISPLAYED TO PERMIT USER TO SELECT LANGUAGE
Messages appear on screen simultaneously or scroll cross screen, or are spoken to user via a speaker after the LANGUAGE button 33 is depressed.

| Message No. | Message |
| --- | --- |
| 1 | FOR ENGLISH PRESS 2* |
| 2 | POUR FRANCAIS POUSSER 3** |
| 3 | FUR DEUTSCHE STOSSEN 4*** |

*"2" is button 15 in FIG. 2.
**"3" is button 16 in FIG. 2.
***"4" is button 17 in FIG. 2.

TABLE II

AUXILIARY MESSAGES (Visually or Audibly Displayed)

| Software Selects When | Message No. | English (Default language, used after buttons 33, 15 pressed in sequence per Table I) | French (Used after buttons 33, 16 pushed in sequence per Table I) | German (Used after buttons 33, 17 pushed sequence per Table I) |
| --- | --- | --- | --- | --- |
| Button 35 Pressed | 1 | Press 2* | Pousser 2** | Stossen 2*** |
| Button 34 Pressed | 2 | Press 3**** | Pousser 3**** | Stossen 3**** |
| Button 36 Pressed | 3 | Press 4+ | Pousser 4++ | Stossen 4+++ |
| . | . | . | . | . |
| . | . | . | . | . |
| . | . | . | . | . |

*After buttons 35, 15 (FIG. 2) are pressed, the telephone software automatically dials an English speaking operator to assist the caller in making a reservation.
**After buttons 35, 15 (FIG. 2) are pressed, the telephone software automatically dials a French speaking operator to assist the caller in making a reservation.
***After buttons 35, 15 (FIG. 2) are pressed, the telephone software automatically dials a German speaking operator to assist the caller in making a reservation.
****After buttons 34, 16 (FIG. 2) are pressed, the telephone displays the time to the user either visually or audibly.
+After buttons 36, 17 (FIG. 2) are pressed, the telephone software automatically dials an English speaking operator to assist the caller in leaving a message.
++After buttons 36, 17 (FIG. 2) are pressed, the telephone software automatically dials a French speaking operator to assist the caller in leaving a message.
+++After buttons 36, 17 (FIG. 2) are pressed, the telephone software automatically dials a German speaking operator to assist the caller in leaving a message.

TABLE III

NUMBERS FOR DIALING OPERATORS SPEAKING SELECTED LANGUAGES

| Telephone Number | Language Spoken by Remote Operator |
| --- | --- |
| 1 213 666 6666 | German |
| 1 202 444 4444 | French |

TABLE III-continued

NUMBERS FOR DIALING OPERATORS SPEAKING SELECTED LANGUAGES

| Telephone Number | Language Spoken by Remote Operator |
| --- | --- |
| 970 8888 | English (local operator) |

After button 33 is depressed by the user to select a language, the controller 51 generates and transmits 40 to display 41 signals including Messages 1 to 3 from TABLE I. These Messages 1 to 3 are shown on display 41 in the manner illustrated in FIG. 2. If the apparatus includes instructions in four or more different languages and if, consequently, there are four or more message in TABLE I (a message for each language), then the messages can be scrolled onto, up, and off of display screen 41. If the user wishes to converse with an operator or to receive instructions in English, the user presses button 15; if the user wishes to converse with an operator or to receive instructions in French, the user presses button 16; and, if the user wishes to converse with an operator or to receive instructions in German, the user presses button 17. When the user presses button 15, 16, or 17, respectively, in the telephone number entry system 54 to select a language, entry system 54 generates signals which transmits the language elected to controller 51 and to the telephone line information 58. The telephone number entry system 54 can be any suitable system for entering telephone numbers or other data (like the asterisk or pound sign) into the system circuitry. It is anticipated that system 54 would normally comprise a conventional twelve button dialing system of the type illustrated in FIGS. 1 and 2 herein.

The memory 52 can be any suitable prior art memory unit such as are commonly used in telecommunication or other types of communication systems. For example, electromagnetic memories such as magnetic, optical, solid state, etc. or mechanical memories such as paper tape can be utilized. The telephone line information 58 stored in memory 52 can consist of seven digit local telephone numbers, of ten digit long distance telephone numbers, or of numbers having any appropriate number of digits which will be received and processed by telephone company switching equipment.

The telephone line information 54 is also intended to indicate whether a user is using buttons 14-22, 24 to direct dial a number or whether the user has depressed either a button 14-25, 33-36 or a sequence of buttons 14-25, 33-36 which causes the telephone to automatically select and dial a telephone number which is stored in memory 52 and in TABLE III.

Figure 4:
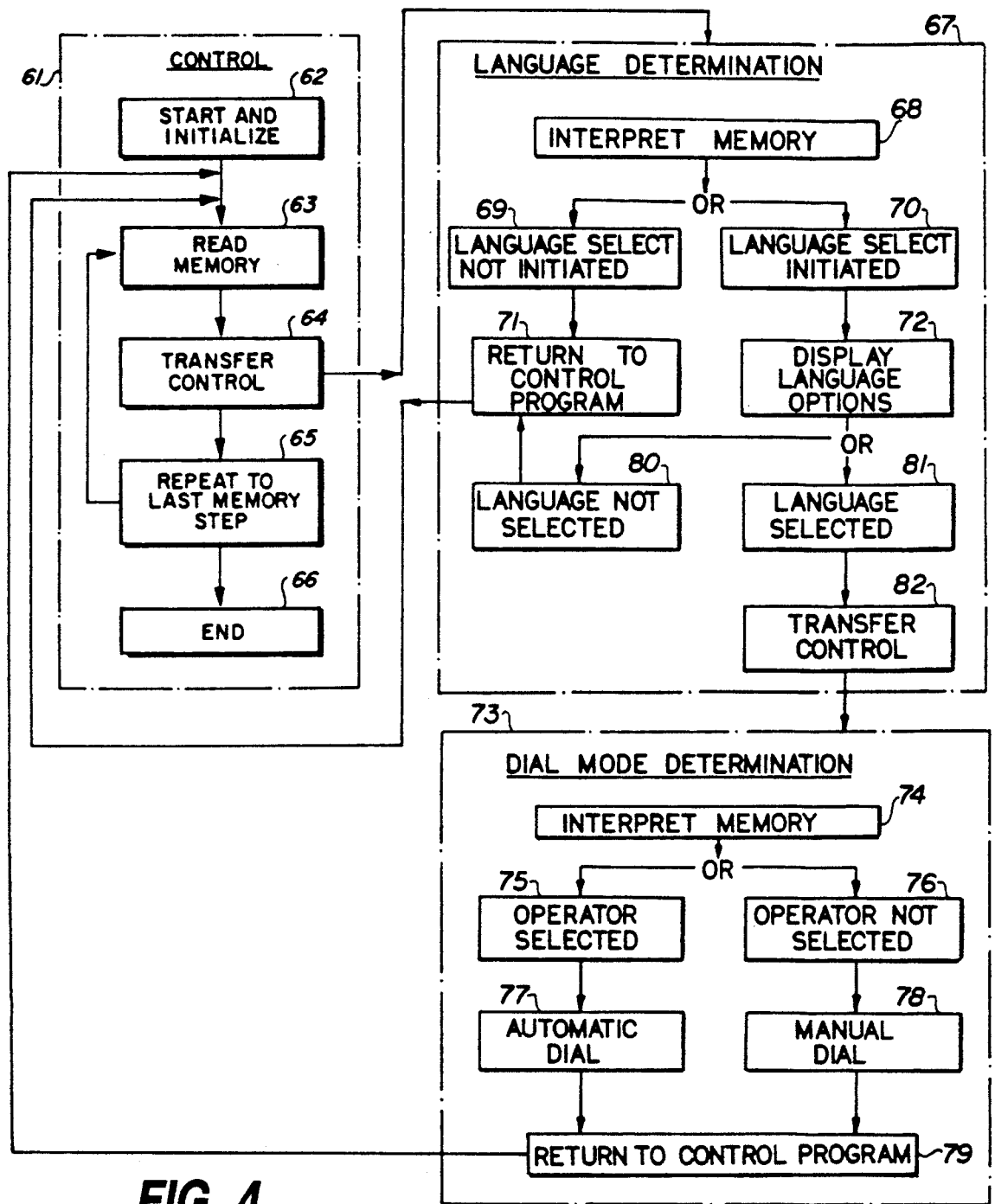

FIG. 4 is a block flow diagram which illustrates a typical program or logic function which is executed by the controller 51 in determining which language is selected by a user and in determining which telephone number is to be dialed and whether the number being dialed is dialed by the user on buttons 14 to 25 or is automatically selected and dialed from TABLE III by the telephone apparatus in response to a selection made by the user. The basic control program 61 consists of commands to "start and initialize" 62, "read memory" 63, and "transfer control" 64 to the language determination sub-routine 67.

The language determination sub-routine 67 consists of commands to "interpret memory" 68 to determine if button 33 has been depressed and "language select initiated" 70 or if button 33 has not been depressed and "language select not initiated" 69. "Language select not initiated" 69 is followed by "return to control program" 71. "Language select initiated" 70 is followed by "display language options" 72 which causes controller 51 to display on display screen 41 the Message Nos. 1 to 3 of TABLE I and to determine whether the user selects a language 81 and does not select a language 80. "Language not selected" 80 is followed by "return to control program 71". "Language selected" 81 is followed by "transfer control" 82 to the dial mode determination sub-routine 73.

The dial mode determination sub-routine 73 consists of commands to "interpret memory" 74 to determine if an "operator is selected" 75 or "operator is not selected" 76. An operator "is selected" 75 if, after selecting a language during the language determination sub-routine 67, the user immediately presses the operator button 24, if, after selecting a language during the language determination sub-routine 67, the user presses the reservation button 35, or if the user selects some other combination of buttons which causes the apparatus circuitry to automatically dial an operator. If the user does not depress button 33 and select a language, the apparatus automatically selects a default language. In this example, the default language is assumed to be English. The operator is "not selected" 76 if, after selecting a language during the language determination sub-routine 67, the user direct dials a number using keys 14-22, 24. Similarly, the circuitry can be programmed such that in the event button 33 is not depressed and the user simply direct dials a number, the dial mode determination sub-routine 73 is activated. "Operator not selected" 76 is followed by "manual dial" 78 in which case the controller generates signals 59 which are fed to the dialing system 50 and embody the telephone number dialed on buttons 14-22, 24 by the user. "Operator selected" 75 is followed by "automatic dial" 77 in which case the controller automatically selects the appropriate telephone number from TABLE III and generates signals 59 which are fed to the dialing system 50 and embody the telephone number automatically selected from TABLE III by controller 51. Both "automatic dial" 77 and "manual dial 78" are followed by "return to control program" 79. The control program 61, language determination sub-routine 67 and dial mode determination sub-routine 73 are repeated as indicated by the "repeat to last memory step" 65 of the control program 61 followed by an "end" program step 66 which completes execution of the program. When the user completes his call and hangs up the telephone, control 61 is ready to start and initialize 62 when the next caller picks up the handset 11. After the user completes his call and hangs up the telephone, the message "PRESS LANGUAGE BUTTON" appears on screen 41 in English, French, and German.

If after the user presses button 33 and selects the French language, the user depresses button 35 to make a reservation, controller 51 selects Message No. 1 from TABLE II and generates signals 40 to display screen 41 such that Message No. 1 is displayed in the French format shown in TABLE II. The controller 51 displays the message in French because the user selected that language, and because the circuitry software knows that button 35 has been depressed. If the user had selected the German language, Message No. 1 from TABLE II would have been displayed in the German format shown in TABLE II. As would be appreciated by those of skill in the art, any number of selected messages can each be stored in memory 52 in a plurality of different languages and can be recalled and shown by display 41 screen when user presses a defined sequence of buttons to make the necessary entries into the telephone apparatus of FIGS. 1 and 2 to cause the controller 51 to display the message or instruction on display screen 41 in the language selected by the user.

In use, a user approaches the telephone apparatus of FIGS. 1 and 2 and notes the message "PRESS LANGUAGE BUTTON" on screen 41 in several languages. The user can ignore the message on screen 41 and simply direct dial a number using keys 14–22, 24. When the user direct dials in this fashion, the dial mode determination sub-routine 73 is activated and the resulting "manual dial" 78 command causes controller 51 to generate signals 59 which are fed to the dialing system 50 and embody the telephone number dialed on button 14–22, 24 by the user.

If, instead, the user elects not to direct dial and presses the language button 33, controller 51 causes the three messages from TABLE I to appear on screen 41 and the user depresses button 15, 16, or 17 to elect the English, French, or German language. If after the user elects a language, the user depresses button 24 to obtain an operator, controller 51 selects from TABLE III the telephone number of the operator who speaks the selected language and automatically dials up the operator using that telephone number. For example, if the elected language were French, then the controller 51 would have system 50 dial the number 1 202 444 4444. If after the user elects a language, the user depresses one of buttons 34, 35, 36, appropriate messages appear on screen 41 in the language selected by the In an alternate embodiment of the invention, the controller 51 does not utilize the messages in TABLE I. Instead, the controller 51 uses the messages in TABLE IV below.

TABLE IV

MESSAGES DISPLAYED TO PERMIT USER TO SELECT LANGUAGE
Messages appear individually on screen. Each time the LANGUAGE button 33 is depressed a different message appears on the screen.

| Message No. | Message |
|---|---|
| 1 | DIAL PHONE NUMBER OR INSERT YOUR CARD |
| 2 | COMPOSEZ VOTRE NUMERO OU BIEN INTRODUISEZ VOTRE CARTE |
| 3 | TELEPHONNUMMER WAHLER ODER KREDITKARTE EIN FUHREN |

When a user first approaches the telephone apparatus of FIGS. 1 and 2, the message "DIAL PHONE NUMBER OR INSERT YOUR CARD" appears on display screen 41 in English instead of the messages "FOR ENGLISH PRESS 2", "POUR FRANCAIS POUSSER 3", and "FUR DEUTSCH STOSSEN 4". In this alternate embodiment the message "DIAL PHONE NUMBER OR INSERT YOUR CARD" is displayed in another language when the language button 33 is pushed. For example, when button 33 is depressed and released, the message "DIAL PHONE NUMBER OR INSERT YOUR CARD" is displayed in French as "COMPOSEZ VOTRE NUMERO AU BIEN INTRODUISEZ VOTRE CARTE". When the button 33 is again depressed, the message "DIAL PHONE NUMBER OR INSERT YOUR CARD" is displayed in German as "TELEPHONRUMMER WAHLER ODER KREDITKARTE EIN FUHREN". And, when button 33 is again depressed, the message is once again displayed in English as "DIAL PHONE NUMBER OR INSERT YOUR CARD". Accordingly, repeatedly pushing and releasing button 33 causes the message "DIAL PHONE NUMBER OR INSERT YOUR CARD" to appear on display screen first in English, then in French, then in German, in English, French, German, English, etc. The user selects the language he wishes to use by simply stopping when the message appear on screen 41 in that language. If the user stops pushing button 33 when the message "COMPOSEZ VORTRE NUMERO AU BIEN INTRODUISEZ VOTRE CARTE" (Message 2 in TABLE IV) is on the screen, then the user has selected the French language and the controller 51 utilizes the French messages in TABLE II and, when the user depresses the "O" button (or some other combination of buttons) to dial the operator, automatically dials the number 1 202 444 4444 in TABLE III to call the French speaking operator. If the user stops pushing button 33 when the message "TELEPHONRUMMER WAHLER ODER KREDITKARTE EIN FUHREN" (Message 3 in TABLE IV) is on the screen 41, then the user has selected the German language and the controller 51 utilizes the German messages in TABLE II and, when the user depresses the "O" button to dial the operator, automatically dials the number 1 213 666 6666 in TABLE III to call the German speaking operator. If the user stops pushing button 33 when the message "DIAL PHONE NUMBER OR INSERT YOUR CARD" (Message 1 in TABLE IV) is on the screen 41, then the user has selected the English language and the controller 51 utilizes the English messages in TABLE II and, when the user depresses the "O" button to dial the operator, automatically dials the number 970 8888 in TABLE III to call the English speaking operator. After the user selects a language, the user can, instead of dialing "O" for operator simply dial a number or, can insert his credit card in credit card reader 45 and, after approval of the credit card is noted on screen 41 in the language selected by the user, direct dial a telephone number. The use of credit cards and credit card readers in dialing telephone numbers is well known and is not explained in detail herein. As would be appreciated by those of skill in the art, the foregoing alternate embodiment of the invention simplifies the steps which have to be taken by the user to select the language used by the apparatus of FIGS. 1 and 2 in communicating with the user.

In still another auxiliary embodiment of the invention, controller 51 does not use the messages in either TABLE I or TABLE IV. Instead, button 33 is labelled "ENGLISH" instead of "LANGUAGE"; button 34 is labelled "FRENCH" instead of being labelled "PRESS FOR TIME"; and, button 35 is labelled "GERMAN" instead of being labelled "RESERVATIONS". The display screen 41 is blank when the user initially begins to use the apparatus of FIGS. 1 and 2. The messages shown in FIG. 2 do not appear on the screen 41. In this auxiliary embodiment, the user simply depresses one of buttons 33, 34, 35 to select the language to be used by the apparatus in communicating with the user. If the user depresses button 33, then the user has selected the English language and the controller 51 utilizes the English messages in TABLE II and, when the user depresses the "O" button to dial the operator, automatically dials the number 970 8888 in TABLE III to call the English speaking operator. If the user depresses button 34, then the user has selected the French language and the controller 51 utilizes the French messages in TABLE II and, when the user depresses the "O" button to dial the operator, automatically dials the number 1 202 444 4444 in TABLE III to call the French speaking operator; etc. Further, for example, button 36 can be labelled "FRENCH OPERATOR" and controller 51 programmed so that when button 36 is depressed controller automatically dials the number 1 202 444 4444 in TABLE III to call the French speaking operator.

Any number of buttons or other means can be incorporated into the apparatus of FIGS. 1 and 2 to enable the user to select a language which the apparatus will use to display audible or visual messages to the user. Once, however, the language is selected, the apparatus of FIGS. 1 and 2 will then display all appropriate messages to the user in that language and will, by automatically dialing a number or numbers retained in the memory of the apparatus, connect the user to an operator, reservation clerk, or other individual who speaks that language and who was requested by the user's pressing the "O" button 24 or activating by touch, by voice, etc. some other means on the apparatus of FIGS. 1 and 2.

Having described my invention in such terms as to enable those skilled in the art to understand and practice it, and having identified the presently preferred embodiments thereof, I Claim:

1. In combination with an existing telephone line in a country having a prominent language spoken by the inhabitants of the country, telephone apparatus comprising
    (a) means for connecting said apparatus to said existing telephone line;
    (b) means for receiving the voice of a user utilizing said apparatus and for transmitting said voice over said telephone line;
    (c) memory means for storing
        (i) a selected number of telephone use instructions, each of said instructions being stored in at least one foreign language different from the prominant language in the country,
        (ii) at least one telephone number for dialing an operator in the country who speaks said foreign language;
    (d) dialing means for entering telephone numbers in said telephone apparatus, the telephone numbers entered on said dialing means being transmitted by said apparatus through said telephone line;
    (e) display means for selectively displaying said telephone use instructions;
    (f) language selection means actuated by the user for selecting said foreign language to display said telephone use instructions on said display means, said instructions instructing the user in said foreign language how to actuate said telephone apparatus and,
    (g) operator dialing means actuated by the user to, after said language selection means is utilized by the user to select said foreign language,
        (i) recall from said memory means the telephone number for the operator who speaks the selected language, and
        (ii) dial said telephone number recalled from said memory means to contact over said telephone line said operator in the country who speaks the foreign language.

2. In combination with an existing telephone line in a country having a prominent language spoken by the inhabitants of the country, telephone apparatus comprising
    (a) means for connecting said apparatus to said existing telephone line;
    (b) means for receiving the voice of a user utilizing said apparatus and for transmitting said voice over said telephone line;
    (c) memory means for storing
        (i) a selected number of telephone use instructions, each of said instructions being stored in at least one foreign language different than the prominent language in the country,
        (ii) at least one telephone number for dialing an operator in the country who speaks said foreign language;
    (d) dialing means for entering telephone numbers in said telephone apparatus, the telephone numbers entered on said dialing means being transmitted by said apparatus through said telephone line;
    (e) display means for selectively displaying said telephone use instructions;
    (f) language selection means actuated by the user for selecting said foreign language to display said telephone use instructions on said display means; and,
    (g) operator dialing means actuated by the user to, after said language selection means is utilized by the user to select said foreign language,
        (i) recall from said memory means the telephone number for the operator who speaks the selected language, and
        (ii) dial said telephone number recalled from said memory means to contact over said telephone line said operator in the country who speaks the foreign language.

3. In combination with an existing telephone line in a country having a prominant language spoken by the inhabitants of the country, telephone apparatus comprising
    (a) means for connecting said apparatus to said existing telephone line;
    (b) means for receiving the voice of a user utilizing said apparatus and for transmitting said voice over said telephone line;
    (c) memory means for storing at least one telephone number for dialing an operator who speaks a foreign language different that the language of prominence in the country;
    (d) dialing means for entering telephone numbers in said telephone apparatus, telephone numbers on said dialing means being transmitted by said apparatus through said telephone line;
    (e) display means for displaying telephone use instructions;
    (f) language selection means actuated by the user individual for selecting said foreign language; and,
    (g) operator dialing means actuated after said language selection means is utilized, said operator dialing means
        (i) recalling from said memory means the telephone number of the operator who speaks said selected foreign language, and
        (ii) dialing said telephone number recalled from said memory means to contact over said telephone line the operator who speaks the foreign language.

* * * * *